(12) United States Patent
Yamazaki et al.

(10) Patent No.: US 7,201,664 B2
(45) Date of Patent: Apr. 10, 2007

(54) FIXED CONSTANT VELOCITY JOINT

(75) Inventors: Kenta Yamazaki, Shizuoka-ken (JP); Junichi Izumino, Shizuoka-ken (JP); Kenji Terada, Shizuoka-ken (JP); Hisaaki Kura, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 36 days.

(21) Appl. No.: 10/274,442

(22) Filed: Oct. 21, 2002

(65) Prior Publication Data
US 2003/0083135 A1 May 1, 2003

(30) Foreign Application Priority Data
Oct. 26, 2001 (JP) ............... 2001-329548

(51) Int. Cl.
*F16D 3/224* (2006.01)

(52) U.S. Cl. ...................... 464/145; 464/906

(58) Field of Classification Search ........ 464/140–145, 464/906
See application file for complete search history.

(56) References Cited

U.S. PATENT DOCUMENTS

| | | | | |
|---|---|---|---|---|
| 1,985,278 A | * | 12/1934 | Bradley | 464/145 |
| 2,046,584 A | * | 7/1936 | Rzeppa | 464/145 |
| 2,182,455 A | * | 12/1939 | Smith | 464/145 |
| 3,540,232 A | * | 11/1970 | Breuer | 464/146 |
| 3,785,172 A | * | 1/1974 | Parsons | 464/906 X |
| 5,230,659 A | * | 7/1993 | Bird et al. | 464/906 X |
| 5,855,519 A | | 1/1999 | Kadota | |
| 6,733,396 B2 | * | 5/2004 | Skvarla et al. | 464/145 |

FOREIGN PATENT DOCUMENTS

| | | |
|---|---|---|
| EP | 1 079 128 A1 | 2/2001 |
| JP | 08-121491 | 5/1996 |
| JP | 09-177813 | 7/1997 |
| JP | 11-182569 | 7/1999 |

* cited by examiner

*Primary Examiner*—Greg Binda
(74) *Attorney, Agent, or Firm*—Arent Fox PLLC (57) ABSTRACT

A fixed constant velocity joint is provided, which is suitable for an application where a rotational backlash should be avoided. A pressing member is attached to a shaft, and simultaneously a receiving member is attached to a cage. Then, an elastic force of an elastic member elastically bring a pressing part of the pressing member in contact with a receiving part of the receiving member. As a result, an inner race and a cage relatively travel in the axial direction, balls are pushed toward a direction along which wedge-shape ball tracks narrow, and consequently a track clearance in the axial direction decreases.

13 Claims, 10 Drawing Sheets

FIXED CONSTANT VELOCITY JOINT

BACKGROUND OF THE INVENTION

1. Field of the Invention

The present invention relates to a fixed constant velocity joint, and a vehicle steering apparatus including this fixed constant velocity joint, and in particular, relates to a fixed constant velocity joint appropriate for an application where a rotational backlash should be avoided.

2. Description of the Related Art

A constant velocity joint is divided roughly into a fixed type which allows only an angular displacement between input and output shafts, and a slide type which allows both an angular displacement and an axial displacement, and they are individually selected according to their applications and operation conditions.

As the fixed constant velocity joint, Rzeppa type (abbreviated as "BJ" hereafter) and undercut free type (abbreviated as "UJ" hereafter) are widely known.

Both the BJ and the UJ include an outer race having a plurality of curved track grooves on an inner peripheral surface thereof, an inner race having a plurality of curved track grooves on an outer peripheral surface thereof, balls incorporated between the track grooves on the inner race and the outer race, and a cage for holding the balls. The track center of the outer race is displaced from the spherical center of the inner periphery of the outer race, and the track center of the inner race is displaced from the spherical center of the outer periphery of the inner race. Both are displaced by the same distance, but in the opposite directions in the axial direction. As a result, the ball track including the track groove on the outer race and the track groove on the inner race has a wedge shape widening toward the inner side or the opening side of the outer race. The entire part of the individual track grooves is curved with the outer race track center or the inner race track center as its center in the BJ. On the other hand, one end of the individual track grooves is straight in the axial direction in the UJ.

A clearance exists between the track grooves of the outer race and the track grooves of the inner race from the necessity of functionality and manufacturing in these fixed constant velocity joints. This clearance (track clearance) is a travel in the radial or the axial direction of the inner race or the outer race which is not fixed while the other one of the inner race or the outer race is fixed in a neutral state of the joint, and is called as a track clearance in the radial direction or a track clearance in the axial direction depending on the direction of the travel.

The magnitude of the track clearance largely affects a backlash in the circumferential direction (a rotational backlash) between the inner race and the outer race (the rotational backlash increases as the track clearance increases). Since the track clearance is indispensable in the fixed constant velocity joint as described above, and thus, the generation of the rotational backlash more than a certain amount is unavoidable, the fixed constant velocity joint of this type has not been used generally for an application such as a steering apparatus for a vehicle where a backlash should be avoided.

SUMMARY OF THE INVENTION

In view of the foregoing, an object of the present invention is to provide a fixed constant velocity joint appropriate for an application where a rotational backlash should be avoided.

To attain the object described above, the present invention provides a fixed constant velocity joint including: an outer member provided with a spherical inner surface including a plurality of track grooves formed thereon; an inner member provided with a spherical outer surface including a plurality of track grooves formed thereon; balls placed in ball tracks in a wedge shape formed by the track grooves on the outer member and the track grooves on the inner member; a cage, placed between the spherical inner surface of the outer member and the spherical outer surface of the inner member, for retaining the balls; a pressing part for applying an elastic pressing force in an axial direction; and a receiving part for receiving the pressing force from the pressing part. Either the pressing part or the receiving part is provided on the cage, and the other one of them is provided on the inner member.

When the pressing part and the receiving part are respectively provided on the inner member and the cage in this way, the inner member and the cage relatively travel in the axial direction due to the elastic force. Consequently, since the track clearance in the axial direction is decreased through the balls, the rotational backlash is prevented.

Figure 1:
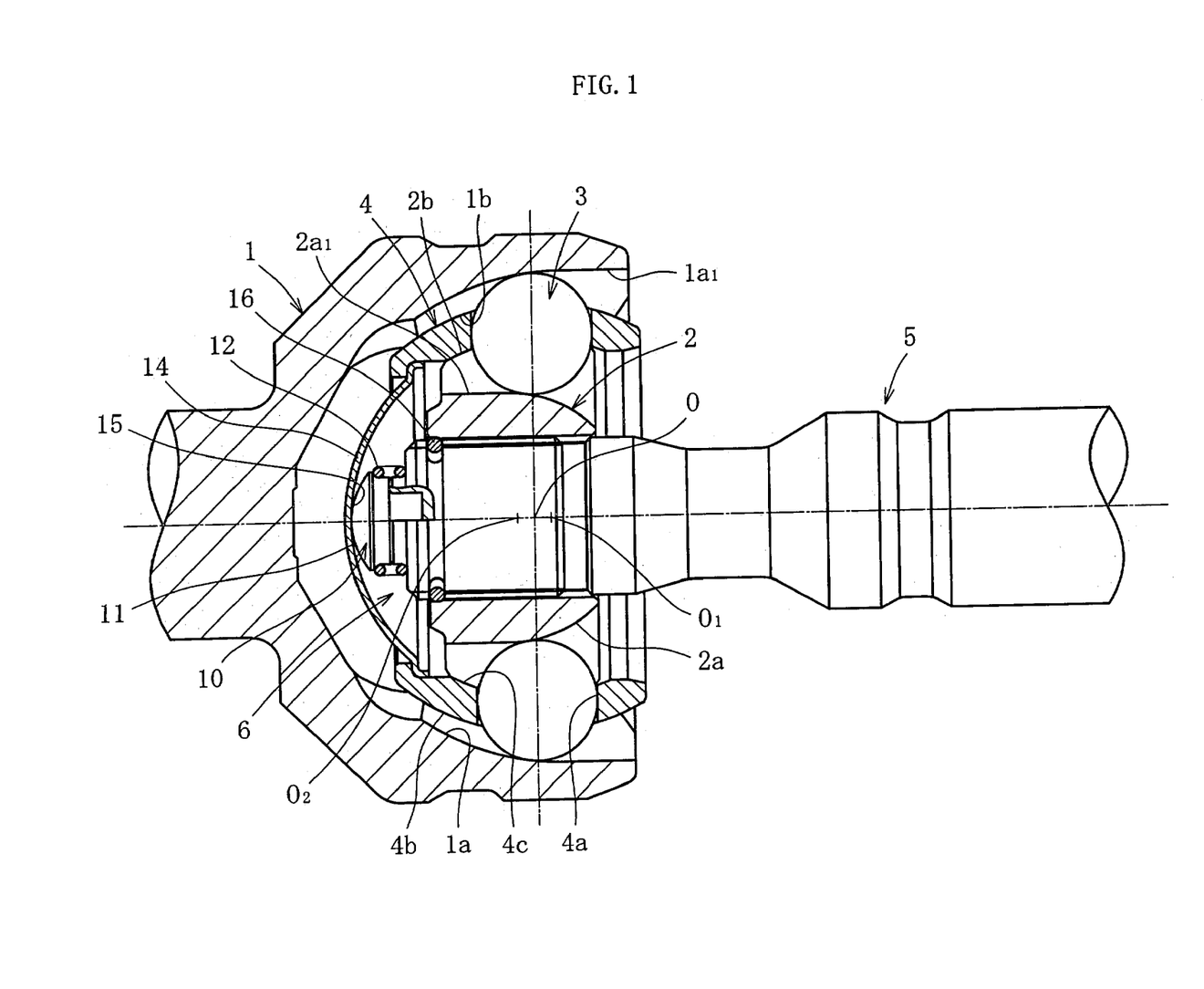
FIG. 1 is a sectional view showing an embodiment of a fixed constant velocity joint including a pressing part provided on an inner member and a receiving part provided on a cage according to one embodiment of the invention.
Figure 8:
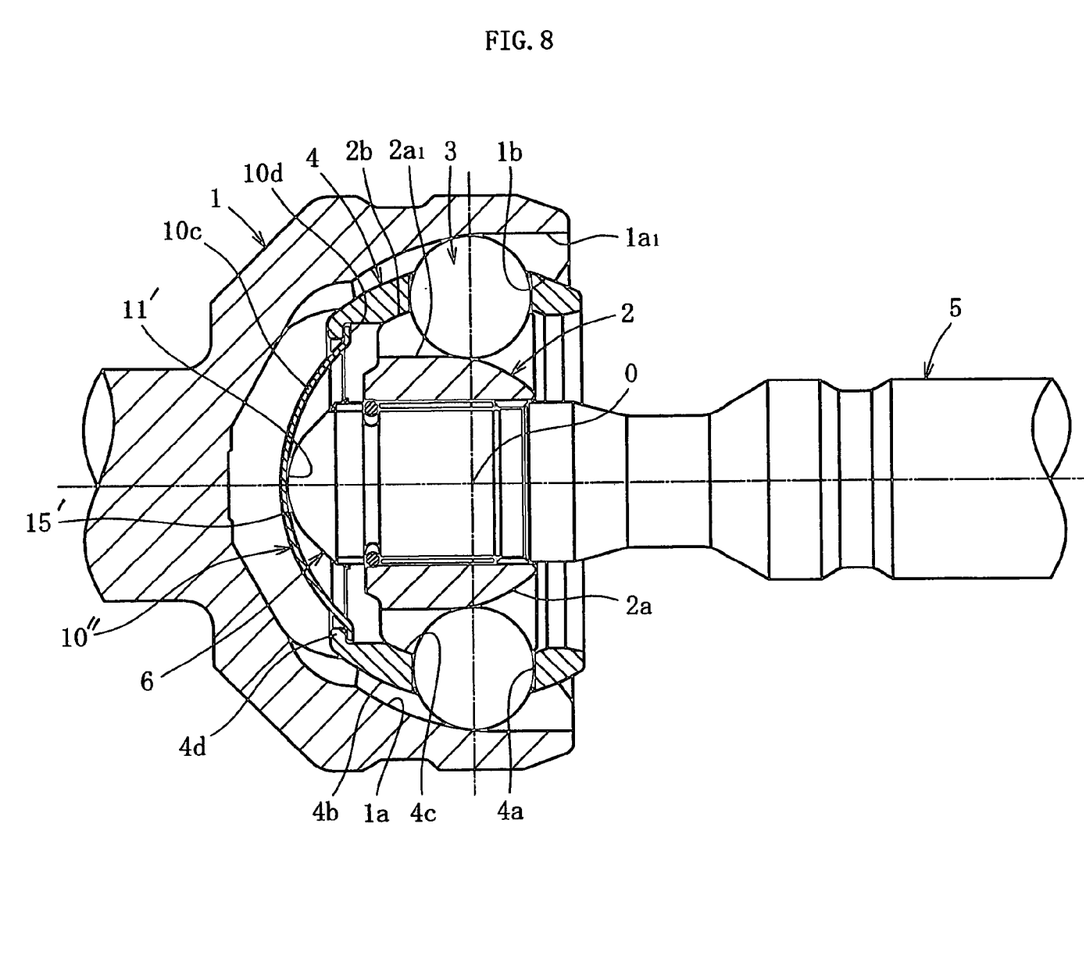
FIG. 8 is a sectional view showing an embodiment of a fixed constant velocity joint including the pressing part provided on the cage and the receiving part provided on the inner member.

As the following part describes specifically, when the pressing part 11 and the receiving part 15 are provided on the inner member 6 and the cage 4 respectively as shown in FIG. 1, for example, an elastic contact between the pressing part 11 and the receiving part 15 pushes the cage 4 toward the inner part of the outer member 1 and the inner member 6 toward the opening of the outer member 1, respectively, thereby generating a relative travel in the axial direction between them. As a result of this relative travel, since the balls 3 are pushed through the cage 4 toward a direction along which the ball tracks narrow, the track clearance in the axial direction decreases, and the generation of the rotational backlash is prevented. On the other hand, when the pressing part 11 and the receiving part 15 are provided on the cage 4 and the inner member 6 respectively as shown in FIG. 8, similarly, the balls 3 are pushed toward the direction along which the ball tracks narrow. As a result, the track clearance in the axial direction decreases, and the generation of the rotational backlash is prevented.

As the description above clearly states, it is necessary to apply the elastic pressing force such that the balls are pushed toward the direction along which the ball tracks narrow. As means for generating the elastic pressing force, a spring member such as a coil spring, a wave spring, and a disc spring, and an elastic material such as resin and rubber may be applied.

Slight spherical surface clearances are generally formed between an inner member (inner race) and the cage, and between the outer member (outer race) and the cage for machining and functionality reasons in the fixed constant velocity joint. When an axial clearance formed by the spherical clearance between the inner race and the cage is smaller than the track clearance in the axial direction, since the inner race and the cage come in contact with each other before the track clearance in the axial direction is completely closed, there is a limit for further decreasing the track clearance in the axial direction. Thus, it is preferred that the axial clearance between the inner race and the cage be larger than the track clearance in the axial direction.

It is preferred that either one of the pressing part 11 and the receiving part 15 provided on the cage 4 (such as the receiving part 15 in FIG. 1) be formed to have a concave spherical surface larger in diameter than the spherical outer surface 2b of the inner member 6. With this constitution, when there exists an operating angle, contact/interference of the one provided on the cage 4 with the spherical outer surface 2b of the inner member 6 is prevented, and consequently a smooth angular displacement is enabled.

When the other one of the pressing part 11 and the receiving part 15 provided on the inner member 6 (the pressing part 11 in the example above) is formed as a convex spherical surface smaller in diameter than the one of the pressing part 11 and the receiving part 15 provided on the cage 4, the pressing part 11 and the receiving part 15 smoothly slide, and the operating angle displaces smoothly.

As described above, a Rzeppa type or undercut free type fixed constant velocity joint having any one of the structures described above does not generate a rotational backlash, and thus is preferable for an application such as a vehicle steering apparatus where a rotational backlash should be avoided.

When the fixed constant velocity joint is used for the steering apparatus, since the rotational backlash does not exist, excellent steering feeling is provided, and vibration during traveling is reduced.

BRIEF DESCRIPTION OF THE DRAWINGS

In the accompanying drawings:

FIGS. 6(a) and (b) are enlarged sectional views showing another example of an elastic member.

FIGS. 7(a) and (b) are enlarged sectional views showing another example of the elastic member.

DETAILED DESCRIPTION OF THE PREFERRED EMBODIMENTS

The following will describe embodiments of the present invention based on FIGS. 1 to 13.

FIGS. 1 to 12 exemplify cases where the present invention is applied to an undercut free joint (UJ) which is one type of the fixed constant velocity joints.

As shown in FIG. 1, the constant velocity joint of this type includes principal constitution elements which are an outer race 1 as an outer member, an inner race 2, a plurality of balls 3, and a cage 4. The outer race 1 has a spherical inner surface 1b on which a plurality of track grooves 1a are formed. The inner race 2 has a spherical outer surface 2b on which a plurality of track grooves 2a are formed. The plurality of balls 3 are provided in ball tracks formed by combination of the track grooves 1a of the outer race 1 and the track grooves 2a of the inner race 2. The cage 4 is provided between the spherical inner surface 1b of the outer race 1 and the spherical outer surface 2b of the inner race 2, and includes pockets 4a arranged at equal intervals in the circumferential direction for storing the balls 3. The track grooves 1a and 2a are curves extending in the axial direction, and six (or eight) of them are generally formed on the spherical inner surface 1b and the spherical outer surface 2b respectively. An inner member 6 is constituted by connecting the inner race 2 with a shaft 5 through torque transmission means such as a serration or a spline on an inner periphery of the inner race 2.

In this embodiment, the center $O_1$ of a curved surface of the bottom of the track grooves 1a of the outer race 1 (the outer race track center) is displaced from the spherical center of the spherical inner surface 1b of the outer race 1. simultaneously, the center $O_2$ of a curved surface of the bottom of the track grooves 2a of the inner race 2 (the inner race track center) is displaced from the spherical center of the spherical outer surface 2b of the inner race 2. These displacements are equal but opposite to each other in the axial direction.

Both the spherical center of an outer peripheral surface 4b of the cage 4, and the spherical center of the spherical inner surface 1b of the outer race 1 serving as a guide surface of the outer peripheral surface 4b of the cage 4 coincide with the center of the joint O. Also, both the spherical center of an inner peripheral surface 4c of the cage 4, and the spherical center of the spherical outer surface 2b of the inner race 2 serving as a guide surface of the inner peripheral surface 4c of the cage 4 coincide with the center of the joint O. Thus, the displacement of the outer race track center $O_1$ is an axial distance between the outer race track center $O_1$ and the joint center O, the displacement of the inner race track center $O_2$ is an axial distance between the inner race track center $O_2$ and the joint center O, and both of them are equal.

As described above, a pair of the track grooves 1a and 2a form the wedge-shape ball track which narrows from the opening to the inside of the outer race 1, and the individual balls 3 are built into the ball tracks for rolling.

While the spherical centers of the outer peripheral surface 4b and the inner peripheral surface 4c of the cage 4 coincide with the joint center O in FIG. 1, it is possible to individually displace these spherical centers from the joint center O by an equal distance on the opposite sides along the axial direction.

Figure 4:
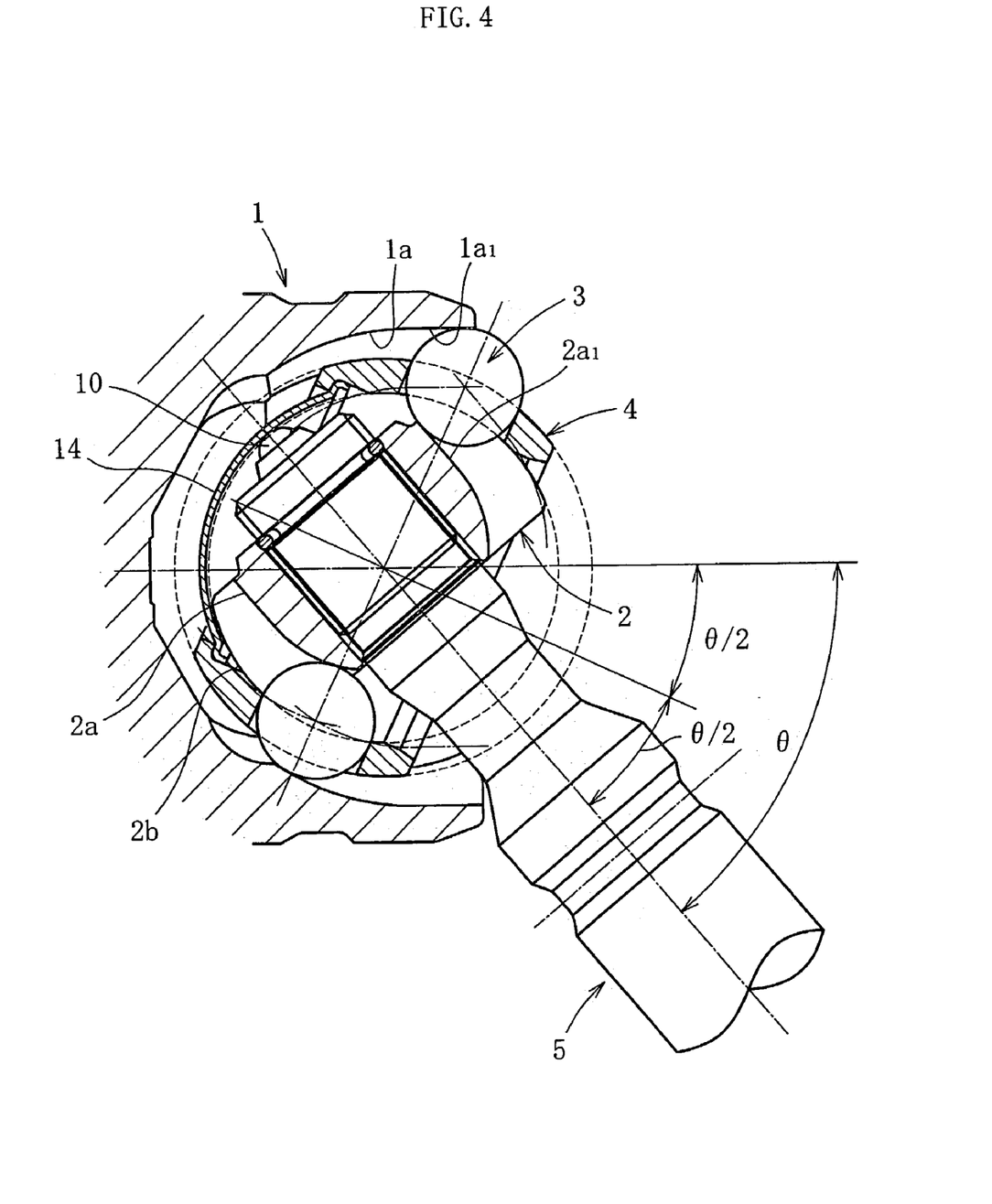
FIG. 4 is a sectional view of the fixed constant velocity joint bent at an operating angle.

In this fixed constant velocity joint, as shown in FIG. 4, when the operating angle between the outer race 1 and the inner race 2 is θ, the balls 3 guided by the cage 4 are always maintained on a bisector surface (θ/2) of any operating angle θ, and the constant velocity is maintained. Since straight parts 1a1 and 2a1 whose groove bottom is parallel with the axial center are respectively formed on an end on one side (the opening side of the outer race) of the track grooves 1a of the outer race 1, and on an end on the other side (the inner side of the outer race) of the track grooves 2a of the inner race 2 in the UJ, the maximum operating angle θ can be about 50° which is larger than the maximum permissible operating angle (about 46°) of a general BJ.

Positive clearances are provided between the pocket 4a of the cage 4 and the ball 3 in the circumferential direction and the axial direction for a smooth rotational operation between the outer race 1 and the inner race 2.

Figure 2:
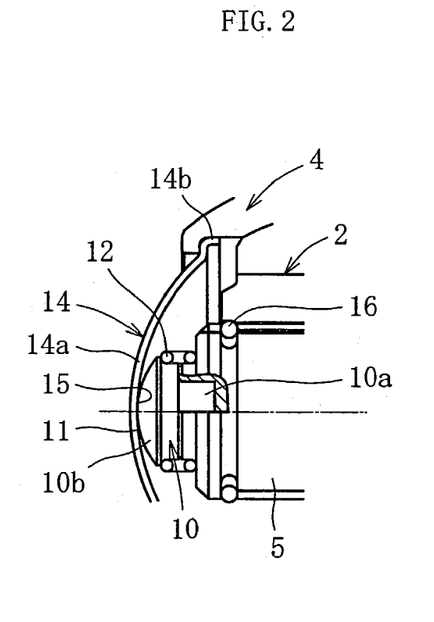
FIG. 2 is an enlarged sectional view of a neighborhood of a shaft end of the embodiment in FIG. 1.

As shown in FIG. 1, a pressing member 10 is attached to a shaft end (on the inner side of the outer race) of the shaft 5 constituting the inner member 6. The pressing member 10 in the drawing includes a cylindrical body 10a and a head 10b protruding outward more than the body 10a in the radial direction, and the body 10a is inserted in the shaft end so as to be slidable in the axial direction while the body 10a is coaxial with the shaft 5 as shown in FIG. 2. A coil spring is interposed as an elastic member 12 between the head 10b and the shaft end, and the elastic member 12 serves as a source for generating an elastic force which acts on the pressing member 10 to press it toward the inner side of the outer race in the axial direction. The end surface of the head 10b is formed as a convex spherical surface, and serves as a pressing part 11 which applies the elastic pressing force in the axial direction.

A receiving member 14 is provided on the end of the cage 4 on the inner side of the outer race. The receiving member 14 is formed in a cover shape covering an end opening of the cage 4 on the inner side of the outer ring, and includes a spherical surface 14a as a part of a whole spherical surface, and a mounting part 14b formed as a ring on the outer periphery of the spherical surface 14a. The inner surface (a surface facing the shaft 5) of the spherical surface 14a is a concave spherical surface, and this concave spherical surface serves as a receiving part 15 for receiving the pressing force from the pressing part 11. The mounting part 14b is fixed to the end of the cage 4 with proper means such as push-in and welding.

Figure 3:
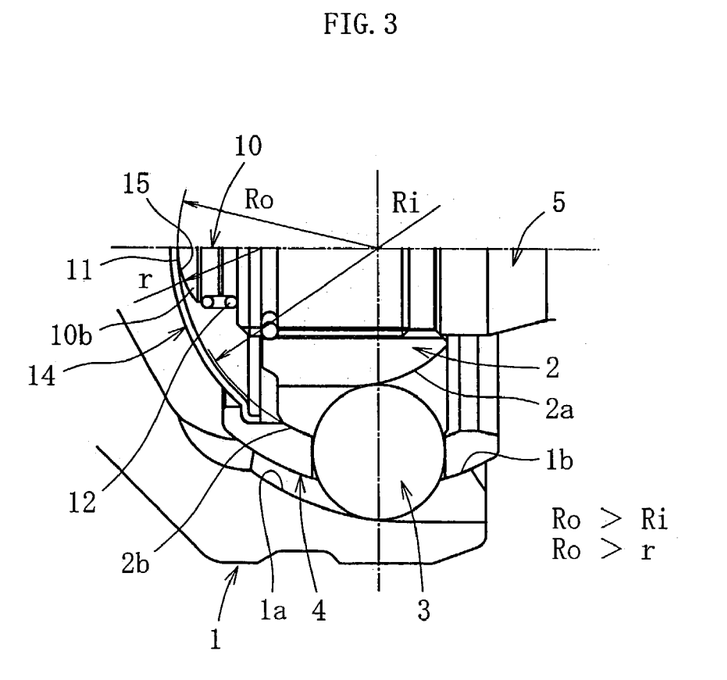
FIG. 3 is an enlarged sectional view of a principal part of the embodiment in FIG. 1.

When an operating angle is present, the inner radius Ro of the receiving part 15 as a concave spherical surface is larger than the outer radius (r) of the pressing part 11 as a convex spherical surface (Ro>r) so as to slide the pressing member 10 and the receiving member 14 smoothly as shown in FIG. 3. Also, when the operating angle θ is present as shown in FIG. 4, the inner radius Ro of the receiving part 15 is larger than the outer radius Ri of the spherical outer surface 2b of the inner race 2 (Ro>Ri) so as to prevent interference between the receiving member 14 and the inner race 2.

It is preferable to apply a surface treatment such as nitrocarburizing for reducing sliding resistance to either one of or both of the pressing part 11 of the pressing member 10 and the receiving part 15 of the receiving member 14 so as to reduce friction resistance between the pressing member 10 and the receiving member 14.

With the constitution described above, when the shaft 5 is engaged with the inner periphery of the inner race 2, and both of them are positioned by a snap ring 16 or the like, the pressing part 11 of the pressing member 10 and the receiving part 15 of the receiving member 14 come in contact with each other, and the elastic member 12 is compressed. As a result, the elastic force in the axial direction is applied between the inner member 6 (the shaft 5 and the inner race 2) and the cage 4, and consequently a relative travel in the axial direction is generated between them. Since this relative travel pushes the balls 3 through the cage 4 toward a direction along which the ball tracks narrow, the track clearance in the axial direction reduces, and thus, the rotational backlash is prevented. As a result of the prevention of the rotational backlash, the fixed constant velocity joint can be used for an application such as a vehicle steering apparatus shown in FIG. 13 where the rotational backlash should be avoided.

Figure 13:
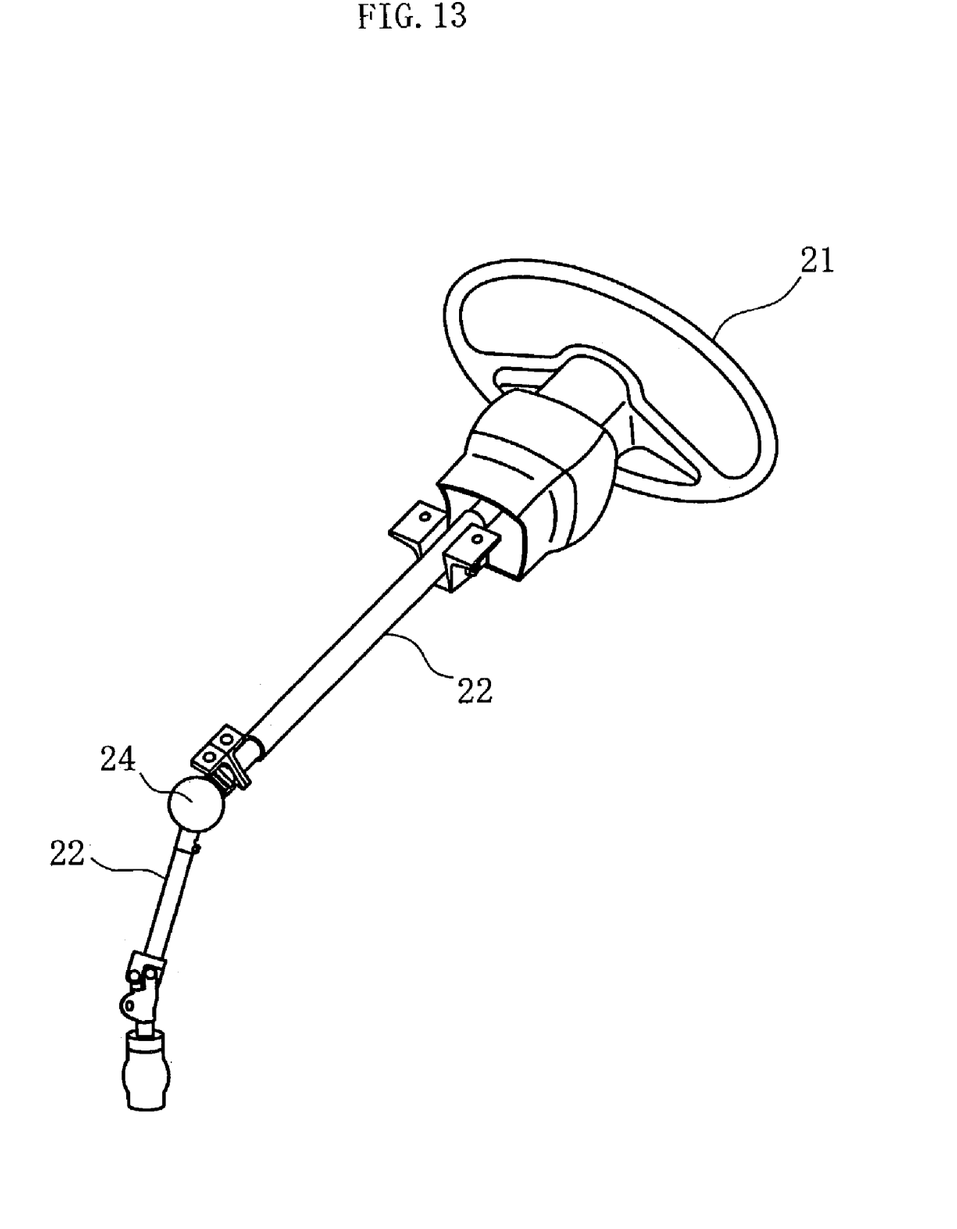
FIG. 13 is a perspective view of a steering apparatus.

The steering apparatus converts a rotary motion of a steering wheel 21 to a reciprocating motion of a tie rod by transmitting the rotary motion to a steering gear through one or more steering shafts 22 as shown in FIG. 13. When the steering shafts 22 are not installed straight due to an installation space on a vehicle and the like, one or more joints 24 are provided between the steering shafts 22 so as to precisely transmit the rotary motion to the steering gear while the steering shaft 22 is bent. The fixed constant velocity joint can be used as this joint 24.

Figure 4A:
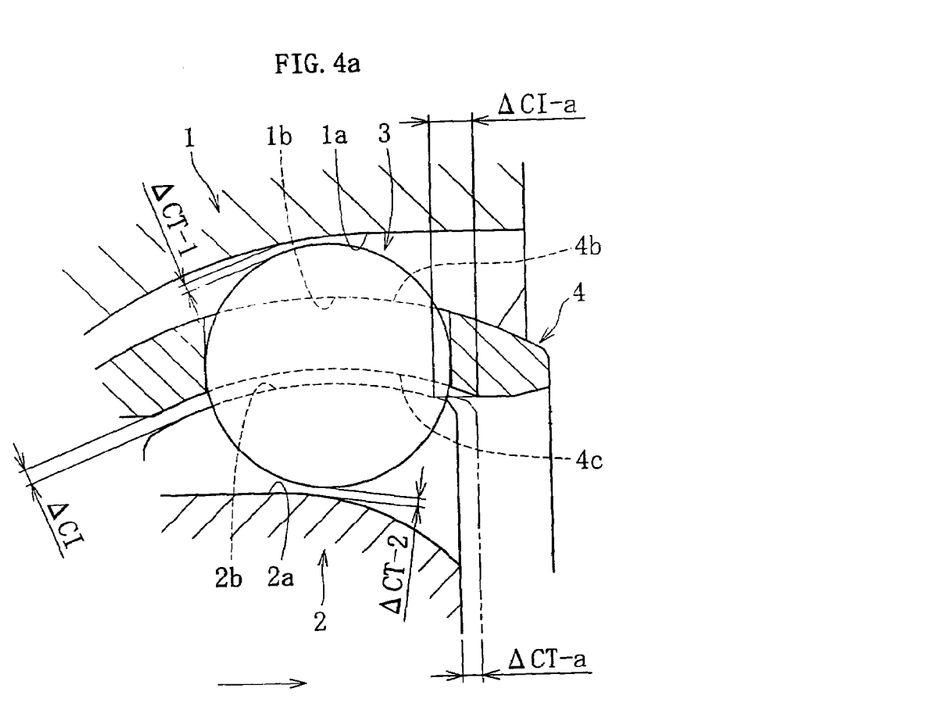
FIG. 4(a) is an enlarged sectional view showing a clearance between the track grooves of the inner and outer races.
Figure 4B:
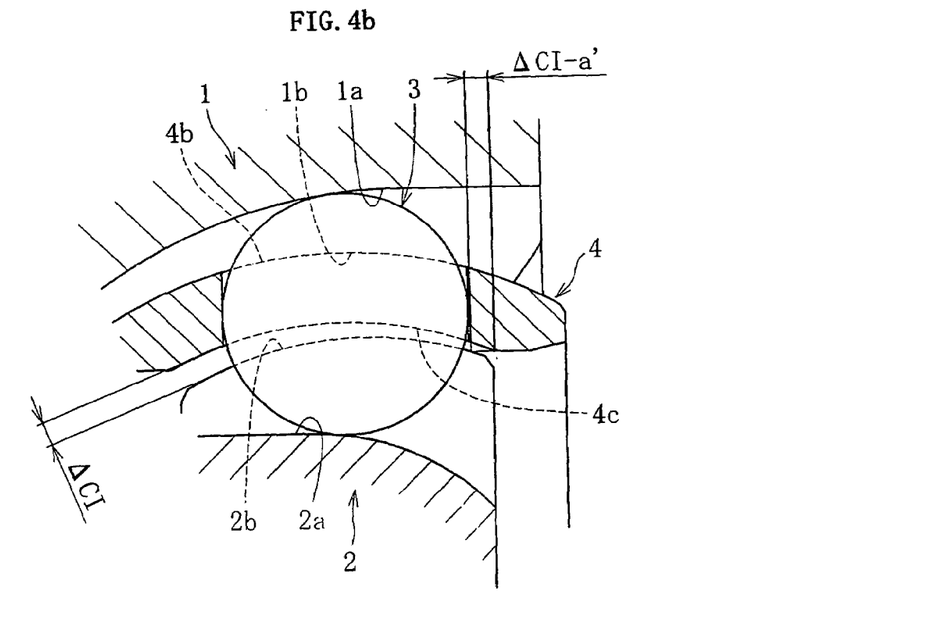
FIG. 4b illustrates the positional relationship after elasticity from the elastic member has been applied.

A slight spherical clearance is formed between the outer peripheral surface 4b of the cage 4 and the spherical inner surface 1b of the outer race 1. A slight spherical clearance is also formed between the inner peripheral surface 4c of the cage 4 and the spherical outer surface 2b of the inner race 2. FIGS. 4a and 4b represents the positional relationship between the inner ring 2 and the ball 3 prior to or later on an elastic action of the elastic member 12 (FIGS. 1–3); ΔCT represents the total track clearance wherein ΔCT-1 represents a clearance between the track groove 1a of the outer race 1 and the outer surface of the ball 3 and ΔCT-2 represents a clearance between the outer surface of the ball 3 and the track groove 2a of the inner race 2. In FIG. 4a, ΔCT=ΔCT-1 +ΔCT-2. It should be noted that the ball 3 can freely move in the rotational direction and the radial direction within the range in which the ball 3 comes in contact with track grooves 1a and 2a. Therefore, ΔCT-1 may become zero when the ball 3 is contacting the track groove 1a, and ΔCT-2 may become zero when the ball 3 contacts the track groove 2a. In any case, however, the size of the track clearance ΔCT will not change, i.e., it is fixed. ΔCT-a represents a travel, also known as a track clearance, in the axial direction[,] of the outer and inner races 1 and 2, and which is not fixed while the other one of the inner race and the outer race is fixed, and which is generated through the track clearance ΔCT. ΔCI represents a spherical clearance between the inner ring 2 and the cage 4. ΔCI-a and ΔCI-a', respectively, represent movable ranges of clearances in the axial direction of the cage with respect to the inner race, which is generated through the spherical clearance ΔCI. In particular, ΔCI-a represents the movable range of the axial clearance between the inner peripheral surface 4c of the cage 4 and the spherical outer surface 2c of the inner race 2 that is generated through the spherical clearance ΔCI prior to the elastic action of the elastic member 12 (see FIG. 4a). Moreover, ΔCI-a' represents the movable range of the axial clearance between the inner ring 2 and the cage 4 after the elasticity from the elastic member 12 (see FIG. 4b) has been applied. When the axial clearance ΔCI-a is smaller than the track clearance ΔCT-a, since the movable range in the axial direction of the cage 4 with respect to the inner race 2 decreases, there is a limit for sufficiently decreasing the track clearance in the axial direction. Thus, it is necessary to set the axial clearance ΔCI-a between the cage 4 and the inner race 2 larger than the track clearance ΔCT-a in the axial direction, i.e. ΔCI-a>ΔCT-a.

Figure 5:
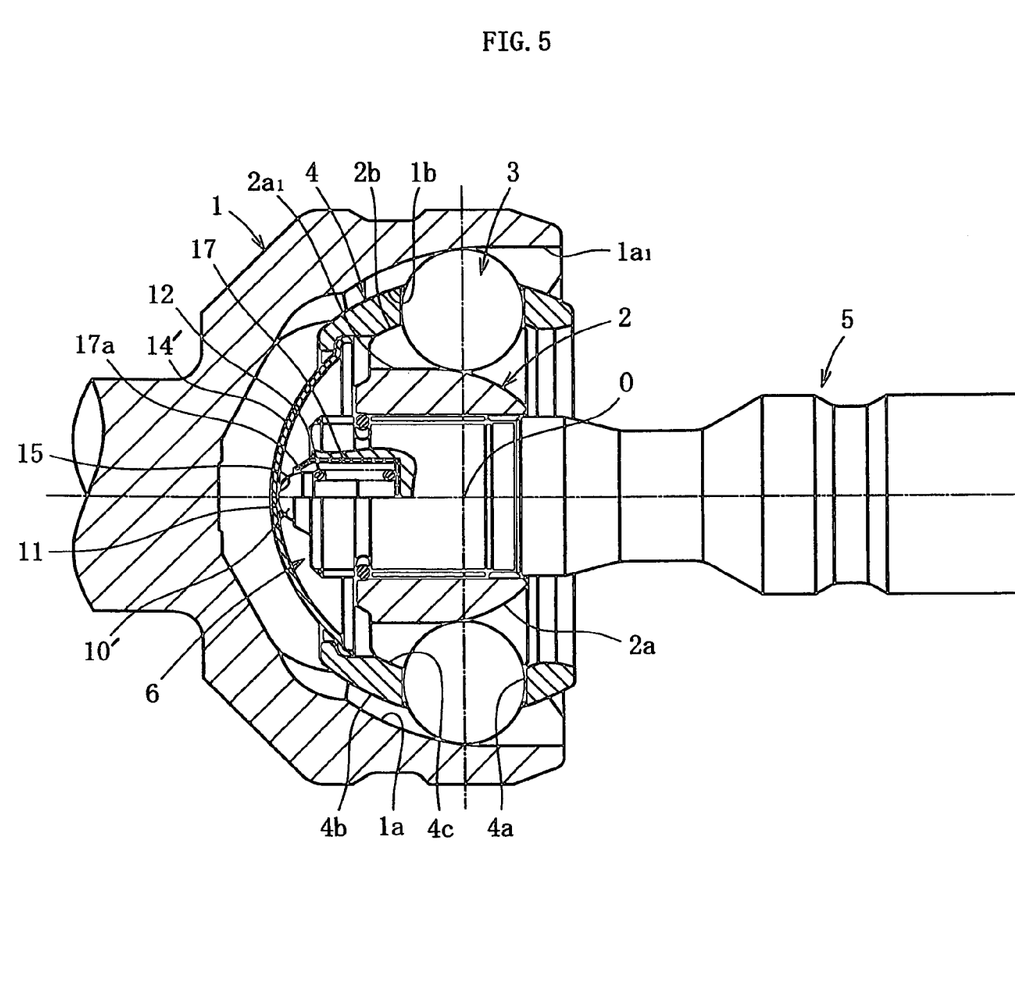
FIG. 5 is a sectional view showing another embodiment.

FIG. 5 shows another embodiment of the present invention, and is different in embedding a coil spring as the elastic member 12 at the end of the shaft 5 from the embodiment shown in FIG. 1. In this embodiment, since a cylindrical storage member 17 is embedded at the shaft end, and the storage member 17 stores the pressing member 10' and the elastic member 12 inside. The end of the storage member 17 is bent toward inside so as to serve as a guide 17a for guiding the pressing member 10'. In this embodiment, the track clearance TC in the axial direction is reduced so as to prevent the rotational backlash as in the embodiment in the FIG. 1. Also, it is possible to form the pressing member 10' as a ball, and to roll the ball on the concave spherical surface of the receiving member 14' so as to reduce the sliding resistance between the pressing member 10' and the receiving member 14', though this constitution is not shown in the drawing.

Figure 6A:
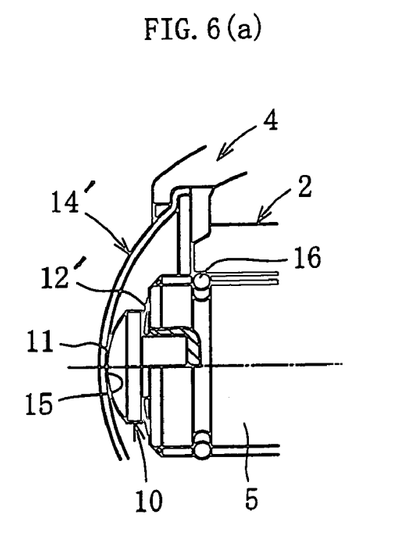
FIG. 6(a) is a case where the elastic member is provide outside the shaft.
Figure 6B:
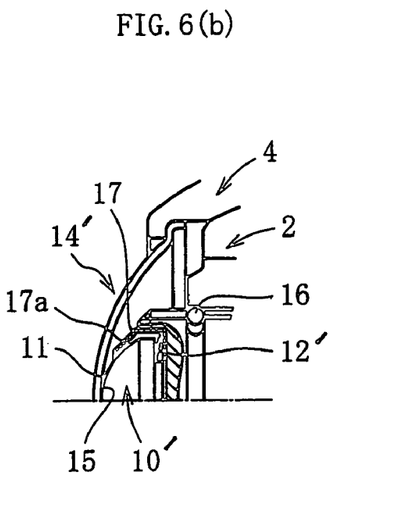
FIG. 6(b) is a case where the elastic member is provided inside the shaft.
Figure 7A:
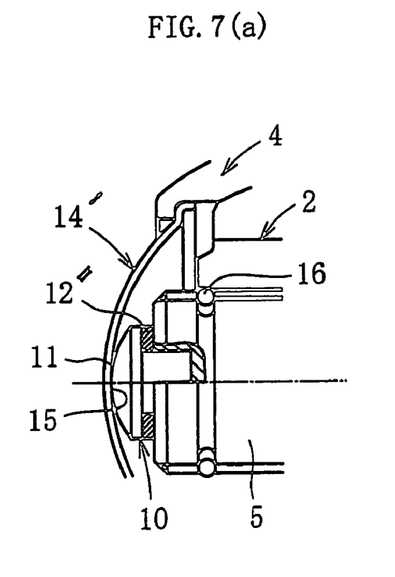
FIG. 7(a) is a case where the elastic member is provide outside the shaft.
Figure 7B:
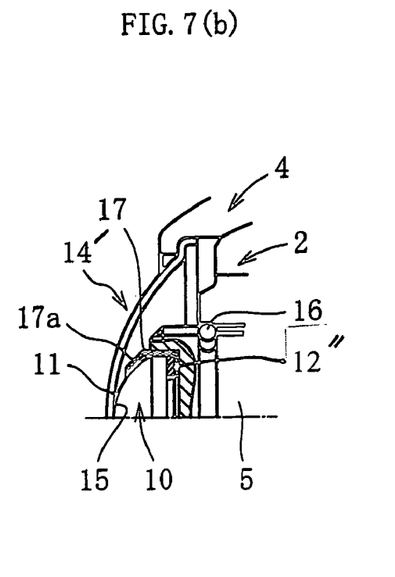
FIG. 7(b) is a case where the elastic member is provided inside the shaft.

Items other than the coil spring can be used as the elastic member 12. FIGS. 6(a) and 6(b) show an example where a disc spring is used as the elastic member 12', and FIGS. 7(a) and 7(b) show an example where a resin material (or a rubber material) is used as the elastic member 12". A wave spring can also be used as the elastic member 12, which is not shown in the drawing.

While the elastic member 12' and 12", respectively, is provided outside the end of the shaft 5 in FIG. 6(a) and FIG. 7(a) as in the embodiment in FIG. 1, the elastic member 12' and 12", respectively, is provided inside the end of the shaft 5 in Fig. 6(b) and FIG. 7(b) using the storage member 17 as in the embodiment in FIG. 5.

FIG. 8 shows an example where the receiving part 15' is provided on the shaft 5 as the inner member 6, and the pressing part 11' is provided on the cage 4, which is opposite to the embodiment in FIGS. 1 to 7. While the receiving part 15' as a convex spherical surface is formed integrally with the shaft 5 in FIG. 8, the receiving part 15' may be attached to the end of the shaft 5 as a separate member (a receiving member).

Figure 9A:
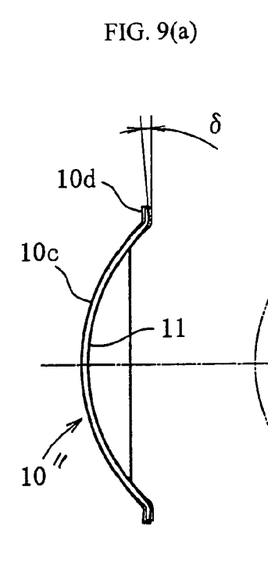
FIG. 9(a) is a sectional view of an elastic member attached to the cage (a sectional view taken along the line Z—Z)
Figure 9B:
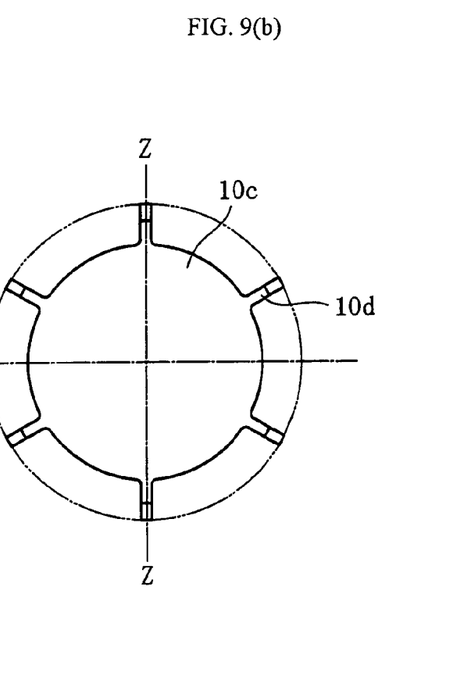
FIG. 9(b) is a front view of the elastic member.

In this embodiment, the pressing member 10" including the pressing part 11' is formed as a cover covering the end opening of the cage 4, and is attached to the end of the cage 4 on the inner side of the outer race as the receiving member 14 in FIGS. 1 to 7. The pressing member 10" includes a spherical surface 10c formed as a part of a whole spherical surface, and a plurality (six in the drawing) of legs 10d protruding from the outer periphery of the spherical surface 10c as shown in FIGS. 9(a) and 9(b). The inner surface (the surface facing the shaft 5) of the spherical surface 10c is a concave spherical surface, and this concave spherical surface serves as the pressing part 11' for applying the elastic force in the axial direction to the receiving part 15'. The pressing part 11' as the concave spherical surface is formed larger in diameter than the spherical outer surface 2b of the inner race 2 so as to prevent interference of the pressing member 10" with the inner race 2 when the operating angle exists (see FIG. 4).

Figures 10A, 10B:
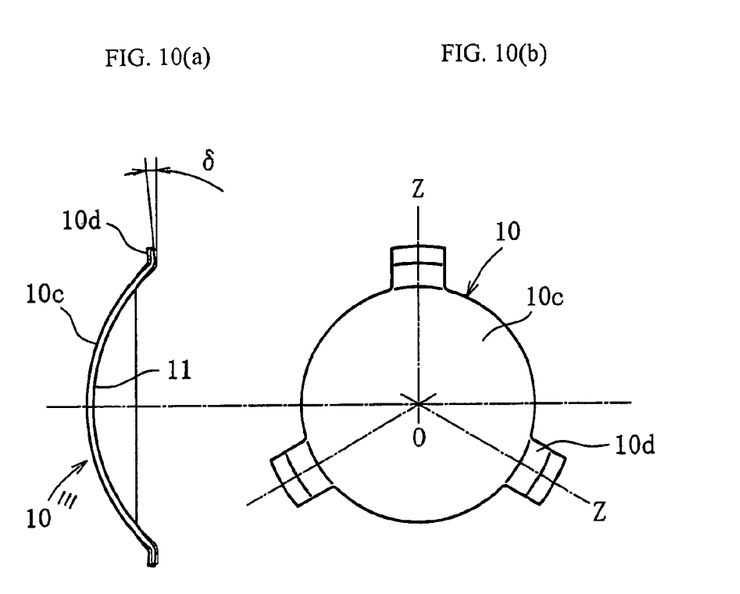
FIG. 10(a) is a sectional view of an elastic member attached to the cage (a sectional view taken along the line Z—Z)
FIG. 10(b) is a front view of the elastic member.

FIGS. 10(a) and 10(b) show another example of the pressing member 10''' where the number of the legs 10d is reduced (such as three), and simultaneously the width of the circumferential direction of the legs 10d is increased compared with the example in FIGS. 9(a) and 9(b).

As shown in FIG. 8, a flange 4d is formed on the inner periphery of the end of the cage 4 on the inner side of the outer race. The pressing member 10" is fixed to the cage 4 by engaging the legs 10d of the pressing member 10" with this flange 4d. As a result, since the pressing part 11' and the receiving part 15' are brought in contact with each other, and the legs 10d mainly deform elastically to generate an elastic force (the elastic deformation quantity of the leg 10d is indicated as δ in this case. See FIGS. 9(a) and 9(b) and FIGS. 10(a) and 10(b)), the inner member 6 (the shaft 5 and the inner race 2) is pressed toward the opening of the outer race, the cage 4 is pressed toward the inner side of the outer race, and consequently the balls 3 are pushed toward the direction along which the ball tracks narrow as in the embodiment in FIG. 1. Thus, the track clearance in the axial direction is decreased, and the rotational backlash is prevented consequently.

Figure 11:
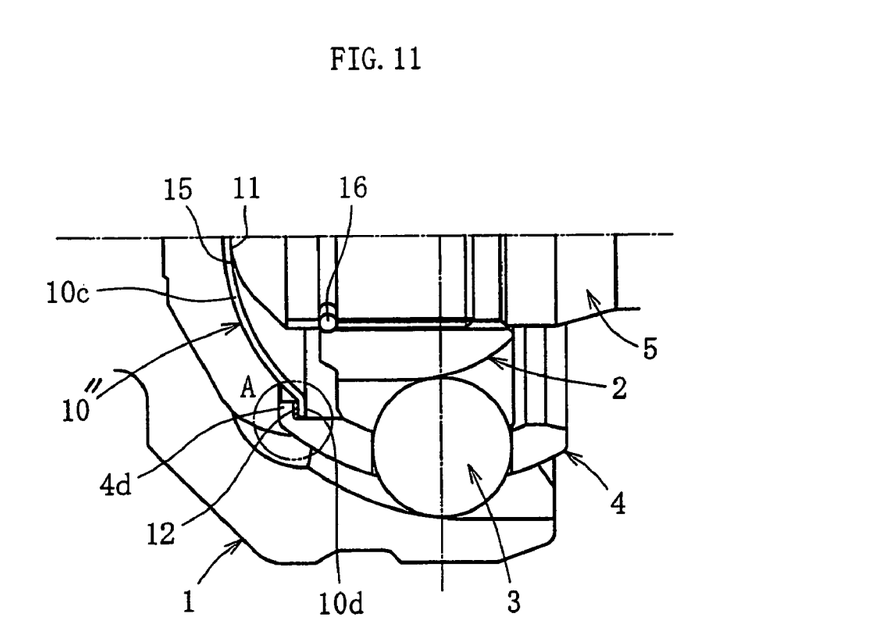
FIG. 11 is a sectional view showing an embodiment where elastic members are interposed between the pressing member and the cage in the embodiment in FIGS. 10(a) and 10(b)
Figure 12:
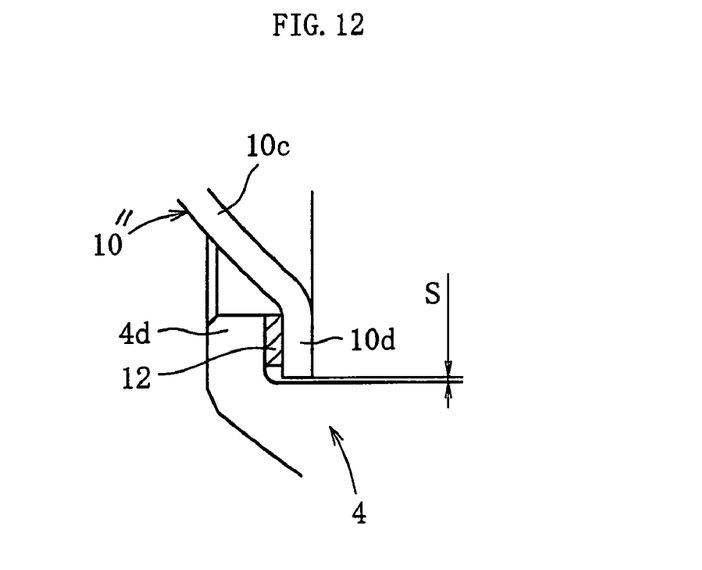
FIG. 12 is an enlarged sectional view of a part A in FIG. 11.

In addition to this case where the pressing member 10" itself generates the elastic force, the elastic members 12 which generate an elastic force in the axial direction may be interposed between the legs 10d of the pressing member 10" and the flange 4d of the cage 4 as shown in FIGS. 11 and 12. A disc spring 12', a wave spring (not shown), and either one of a resin or a rubber material 12" may be used as the elastic member 12. In this case, since the legs 10d move in the axial direction as the elastic members 12, 12', or 12" deform elastically, it is preferable to form a slight clearance S in the radial direction between the outer end of the legs 10d and the inner periphery of the cage 4 so as to avoid the interference between the legs 10d and the cage 4.

While the UJ where the straight parts 1a1 and 2a1 are formed at the parts in the track grooves 1a and 2a is described above as the fixed constant velocity joint, the present invention is not limited to this case, and is widely applied to fixed constant velocity joints such as Rzeppa type which does not include straight parts (the entire tack grooves 1a and 2a are formed as curves with the track centers $O_1$ and $O_2$ as the centers).

In this way, the present invention can decrease the track clearance in the axial direction with a simple structure, and surely prevents a generation of the rotational backlash. Thus, a fixed constant velocity joint such as the BJ and the UJ can be used for an application such as a vehicle steering apparatus where a rotational backlash should be avoided.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A fixed constant velocity joint comprising:
    an outer member provided with a spherical inner surface including a plurality of track grooves formed thereon;
    an inner member provided with a spherical outer surface including a plurality of track grooves formed thereon;
    balls placed in ball tracks having a wedge shape formed by the track grooves on the outer member and the track grooves on the inner member;
    a cage for retaining the balls, the cage placed between the spherical inner surface of the outer member and the spherical outer surface of the inner member; wherein
    a pressing part for applying an elastic pressing force in an axial direction; and
    a receiving part for receiving the pressing force from the pressing part, wherein
    either the pressing part or the receiving part is provided on the cage, and the other one of them is provided on the inner member, and wherein the elastic pressing force is applied such that the balls are pushed through the cage toward a narrowing direction of the ball tracks, wherein the pressing part contacts the receiving part on the shaft axis of the inner member.

2. The fixed constant velocity joint according to claim 1, wherein a movable range in the axial direction of the cage with respect to the inner race is larger than a travel in the axial direction of the inner race or the outer race that is not fixed and when the other of the inner race and outer race is fixed.

3. The fixed constant velocity joint according to claim 1, wherein either one of the pressing part and the receiving part provided on the cage is formed as a concave spherical surface larger in diameter than the spherical outer surface of the inner member.

4. The fixed constant velocity joint according to claim 1, wherein the other one of the pressing part and the receiving part provided on the inner member is formed as a convex spherical surface smaller in diameter than the one provided on the cage.

5. A Rzeppa type fixed constant velocity joint having a structure defined according to any one of claims 1 and 2 through 4.

6. An undercut free type fixed constant velocity joint having a structure defined according to any one of claims 1 and 2 through 4.

7. The fixed constant velocity joint according to any one of claims 1 and 2 through 4, for use in a steering apparatus.

8. A fixed constant velocity joint comprising:
an outer member provided with a spherical inner surface including a plurality of track grooves formed thereon;
an inner member provided with a spherical outer surface including a plurality of track grooves formed thereon;
balls placed in ball tracks having a wedge shape formed by the track grooves on the outer member and the track grooves on the inner member;
a cage for retaining the balls, the cage placed between the spherical inner surface of the outer member and the spherical outer surface of the inner member; wherein
a pressing part for applying an elastic pressing force in an axial direction; and
a receiving part for receiving the pressing force from the pressing part, wherein
either the pressing part or the receiving part is provided on the cage, and the other one of them is provided on the inner member, and wherein the elastic pressing force is applied such that the balls are pushed through the cage toward a narrowing direction of the ball tracks, wherein either one of the pressing part and the receiving part provided on the cage is formed as a concave spherical surface larger in diameter than the spherical outer surface of the inner member.

9. The fixed constant velocity joint according to claim 8, wherein a movable range in the axial direction of the cage with respect to the inner race is larger than a travel in the axial direction of the inner race or the outer race that is not fixed and when the other of the inner race and outer race is fixed.

10. The fixed constant velocity joint according to claim 8, wherein the other one of the pressing part and the receiving part provided on the inner member is formed as a convex spherical surface smaller in diameter than the one provided on the cage.

11. A Rzeppa type fixed constant velocity joint having a structure defined according to claim 8.

12. An undercut free type fixed constant velocity joint having a structure defined according to claim 8.

13. The fixed constant velocity joint according to claim 8, for use in a steering apparatus.

\* \* \* \* \*